(12) United States Patent
Ludwig et al.

(10) Patent No.: US 6,667,761 B1
(45) Date of Patent: Dec. 23, 2003

(54) INSTRUMENT VISUALIZATION SYSTEM

(75) Inventors: Richard A. Ludwig, Bellevue, WA (US); William L. Zabriskie, Redmond, WA (US)

(73) Assignee: Imaging & Sensing Technology Corporation, Horseheads, NY (US)

( * ) Notice: Subject to any disclaimer, the term of this patent is extended or adjusted under 35 U.S.C. 154(b) by 0 days.

(21) Appl. No.: 09/549,363

(22) Filed: Apr. 14, 2000

(51) Int. Cl.[7] .............................. H04N 9/47; G01J 5/00; G01J 5/02; G06K 7/00
(52) U.S. Cl. ........................ 348/61; 348/164; 382/312; 250/349; 379/124
(58) Field of Search .............................. 348/61, 64, 82, 348/87, 164; 382/100, 312, 313; 431/14; 356/418; 117/201, 202; 702/38, 111; 324/613, 614; 374/124; 345/167; H04N 7/18

(56) References Cited

U.S. PATENT DOCUMENTS

| | | |
|---|---|---|
| 3,164,838 A | 1/1965 | Heinrich |
| 4,024,764 A | 5/1977 | Shipman et al. |
| 4,375,333 A | 3/1983 | Clark et al. |
| 4,432,657 A | 2/1984 | Rudzki et al. |
| 4,568,183 A | 2/1986 | Douglas |
| 4,647,774 A | 3/1987 | Brisk et al. |
| 4,647,775 A | 3/1987 | Stein |
| 4,681,434 A | 7/1987 | Kepple |
| 4,687,344 A * | 8/1987 | Lillquist ..................... 348/164 |
| 4,708,474 A | 11/1987 | Suarez-Gonzalez |
| 4,779,977 A | 10/1988 | Rowland et al. |
| 4,815,841 A | 3/1989 | Bickler et al. |
| 4,840,496 A | 6/1989 | Elleman et al. |
| 4,841,460 A | 6/1989 | Dewar et al. |

(List continued on next page.)

OTHER PUBLICATIONS

"Pan–Tilt Controller", Pelco, Inc., Model CM7500 Series Coaxitron Matrix, System 7500 (1990).

(List continued on next page.)

*Primary Examiner*—Gims Philippe
(74) *Attorney, Agent, or Firm*—Nixon Peabody LLP

(57) ABSTRACT

The invention is directed to an improved visualization and measurement system (15). In the preferred embodiment, the visualization system comprises: a video sensor (16) having a range of view (18), a field of view (19), and a video output signal (20), a non-contact instrument (21); having a measurement zone (22) and a measurement output signal (23), the instrument and video sensor being so configured and arranged that the measurement zone is aligned in the field of view; a processor (24) for processing the video output signal and the measurement output signal and for providing a processor output signal (25); a display device (26) for displaying the processor output signal; and a control device (28) for moving the field of view and measurement zone in the range of view. In the preferred embodiment, the processor includes an image processor (29) for combining the video output signal and the measurement output signal into a combined processor output signal, and the display device shows an indication (38) of the measurement zone. In the preferred embodiment, the video sensor is a video camera and the non-contact instrument is a pyrometer.

22 Claims, 3 Drawing Sheets

U.S. PATENT DOCUMENTS

| | | | |
|---|---|---|---|
| 4,881,807 A | 11/1989 | Luce et al. | |
| 4,909,090 A | 3/1990 | McGown et al. | |
| 4,955,979 A | 9/1990 | Denayrolles et al. | |
| 4,979,133 A | 12/1990 | Arima et al. | |
| 5,109,277 A | 4/1992 | James | |
| 5,113,770 A | 5/1992 | Godbe et al. | |
| 5,125,739 A | 6/1992 | Suarez-Gonzalez et al. | |
| 5,138,532 A | 8/1992 | Shirai et al. | |
| 5,164,785 A | 11/1992 | Hopkins et al. | |
| 5,219,226 A * | 6/1993 | James | 374/124 |
| 5,225,883 A | 7/1993 | Carter et al. | |
| 5,231,595 A | 7/1993 | Makino et al. | |
| 5,265,036 A | 11/1993 | Suarez-Gonzalez et al. | |
| 5,311,203 A | 5/1994 | Norton | |
| 5,316,385 A | 5/1994 | Thomas | |
| 5,368,392 A | 11/1994 | Hollander et al. | |
| 5,421,652 A | 6/1995 | Kast et al. | |
| 5,481,957 A | 1/1996 | Paley et al. | |
| 5,491,546 A | 2/1996 | Wascher et al. | |
| 5,626,424 A | 5/1997 | Litvin et al. | |
| 5,640,015 A * | 6/1997 | Kienitz et al. | 250/349 |
| 5,656,078 A | 8/1997 | Fuerhoff | |
| 5,686,690 A | 11/1997 | Lougheed et al. | |
| 5,704,897 A | 1/1998 | Truppe | |
| 5,727,880 A | 3/1998 | Hollander et al. | |
| 5,784,182 A | 7/1998 | Francoeur et al. | |
| 5,823,678 A | 10/1998 | Hollander et al. | |
| 5,823,679 A | 10/1998 | Hollander et al. | |
| 5,834,676 A | 11/1998 | Elliott | |
| 5,836,694 A | 11/1998 | Nguyen | |
| 5,839,829 A | 11/1998 | Litvin et al. | |
| 5,971,747 A | 10/1999 | Lemelson et al. | |
| 5,993,194 A | 11/1999 | Lemelson et al. | |
| 6,092,027 A * | 7/2000 | Takai et al. | 702/38 |
| 6,298,175 B1 * | 10/2001 | Longacre, Jr. et al. | 382/312 |

OTHER PUBLICATIONS

"Pan–Tilt Mechanism", Pelco, Inc., Model PT550P Medium Duty Outdoor Pan/Tilt (1990).

"Pyrometer", Raytek, Inc., Model No. MRISASF, Marathon MR/S (1998).

* cited by examiner

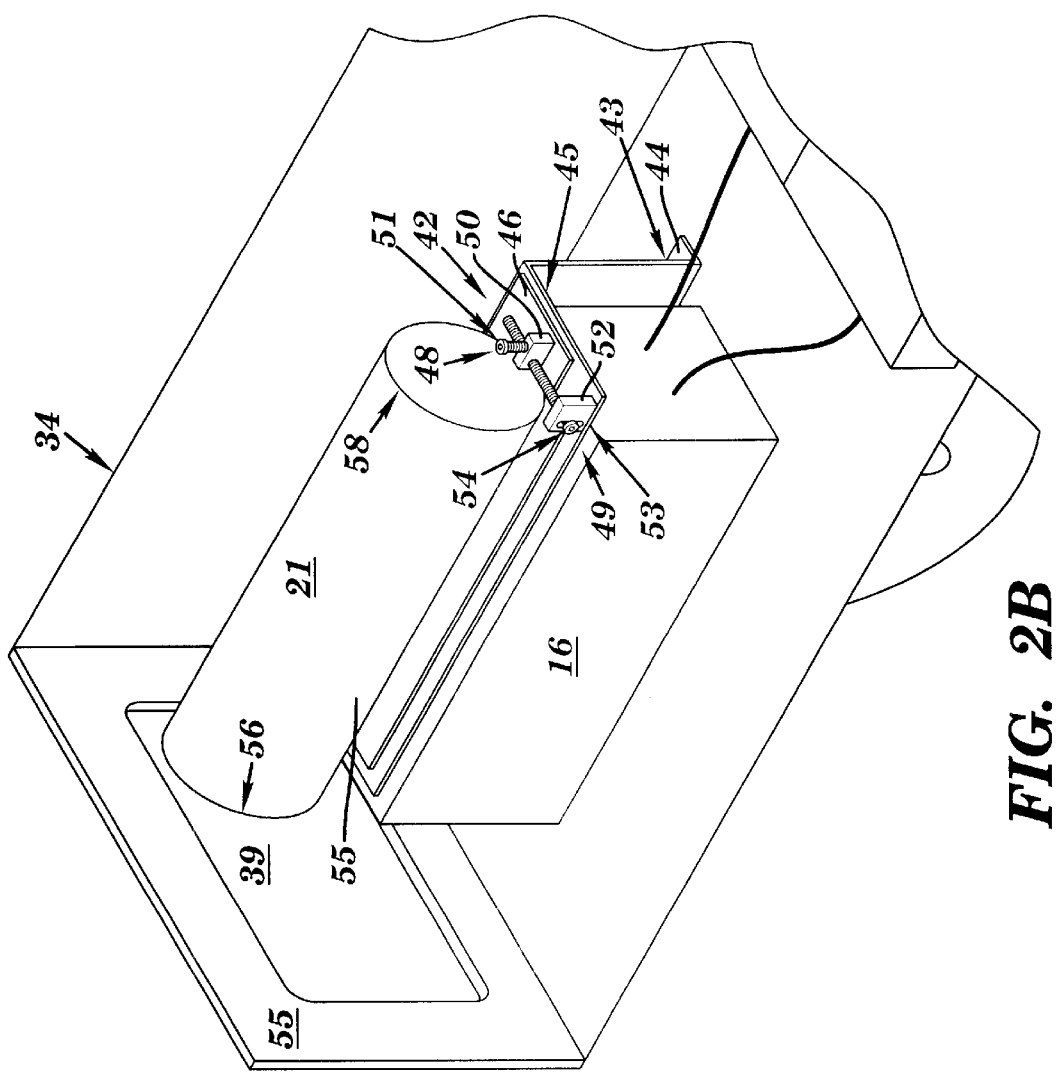
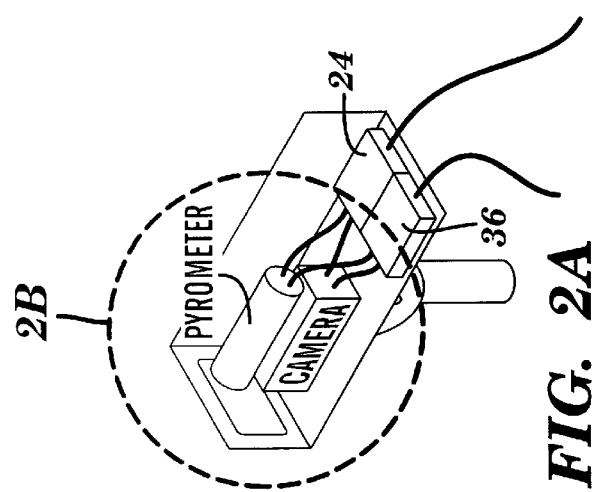
FIG. 2B
FIG. 2A

INSTRUMENT VISUALIZATION SYSTEM

FIELD OF THE INVENTION

The present invention relates generally to the field of video monitoring systems and, more particularly, to an improved visualization system which allows for aiming a non-contact instrument and video sensor at an object and displaying both a visual image and an instrument reading from the targeted object on a display screen.

BACKGROUND ART

A variety of control room video systems are known in which the user may view an environment and measure parameters of the environment being viewed, such as the temperature of certain objects. An example of such a system is disclosed in U.S. Pat. No. 5,219,226, the aggregate disclosure of which is incorporated herein by reference. However, such systems have been limited in that they do not allow precise aiming of both the video sensor and the instrument at an object in the subject area of interest.

Hence, it would be useful to provide a measuring and visualization system which allows for the field of view of the video image to be moved within a broader range of view and the instrument to be visually aimed at targets within the field of view such that environmental measurements may be taken of specific objects within the range of view.

DISCLOSURE OF THE INVENTION

With parenthetical reference to the corresponding parts, portions or surfaces of the disclosed embodiment, merely for the purposes of illustration and not by way of limitation, the present invention provides an improved instrument visualization system (15) comprising a video sensor (16) having a range of view (18), a field of view (19), and a video output signal (20), a non-contact instrument (21) having a measurement zone (22) and a measurement output signal (23), the instrument and video sensor being so configured and arranged that the measurement zone is aligned in the field of view, a processor (24) for processing the video output signal and the measurement output signal and for providing a processor output signal (25), a display device (26) for displaying the processor output signal, and a control device (28) for moving the field of view and measurement zone in the range of view.

The processor may include an image processor (29) for combining the video output signal and the measurement output signal into the combined processor output signal. The display device may show an indication (38) of the measurement zone. The video sensor may be a color CCD image sensor, a CMOS image sensor, a Focal Plane Array image sensor, or an infrared image sensor. The non-contact instrument may be a pyrometer (21), a gamma radiation sensor, or a spectrometer. The control device may be manually operated from a position remote to the video sensor so as to move the field of view in the range of view, or the control device may be programmed to move the field of view along a preselected or a random path within the range of view.

Accordingly, the general object of the present invention is to provide an improved visualization system which allows for viewing an area and taking environmental measurements of objects within the area.

Another object of the invention is to provide an improved visualization system which allows the operator to change the field of view of the video sensor.

Another object of the invention is to provide an improved visualization system in which the operator may aim an instrument at an object within the field of view of the video sensor.

Another object of the invention is to provide an improved visualization system which provides environmental measurements of objects within the video sensor's field of view.

Another object of the invention is to provide an improved visualization system in which both a video image and environmental measurements from targeted objects are displayed to the operator.

Another object of the invention is to provide an improved visualization system in which the video output signal and the instrument output signal are combined into a combined signal which may be read by a display device.

Another object of the invention is to provide an improved visualization system in which an indication of the measurement zone of an instrument is shown on a display device.

Another object of the invention is to provide an improved visualization system in which the video sensor is a color CCD sensor.

Another object of the invention is to provide an improved visualization system in which the video sensor is a infrared sensor.

Another object of the invention is to provide an improved visualization system in which the instrument is a pyrometer.

Another object of the invention is to provide an improved visualization system in which the instrument is a gamma radiation sensor.

Another object of the invention is to provide an improved visualization system in which the instrument is an spectrometer.

Another object of the invention is to provide an improved visualization system in which the motion of the video sensor and the instrument may be controlled by an operator.

Another object of the invention is to provide an improved visualization system in which the operator may manually adjust the video sensor and instrument from a remote position.

Another object of the invention is to provide an improved visualization system in which the control device may be programmed to move the video sensor's field of view along a preselected or a random path.

Another object of the invention is to provide an improved visualization system in which the instrument measurements are stored for future retrieval and use.

Another object of the invention is to provide an improved visualization system in which a video sensor and an instrument are securely aligned within a field of view.

Another object of the invention is to provide an improved visualization system in which the center of the video sensor and the center of measurement zone of the instrument are aligned.

These and only objects and advantages will become apparent from the foregoing and ongoing written specification, the drawings, and the appended claims.

BRIEF DESCRIPTION OF THE DRAWINGS

FIG. 2A is a perspective view of an alignment mechanism for the video sensor and instrument shown in FIG. 1.

FIG. 2B is an enlarged view of a portion of the alignment mechanism shown in FIG. 2A.

DESCRIPTION OF THE PREFERRED EMBODIMENTS

Figure 1:
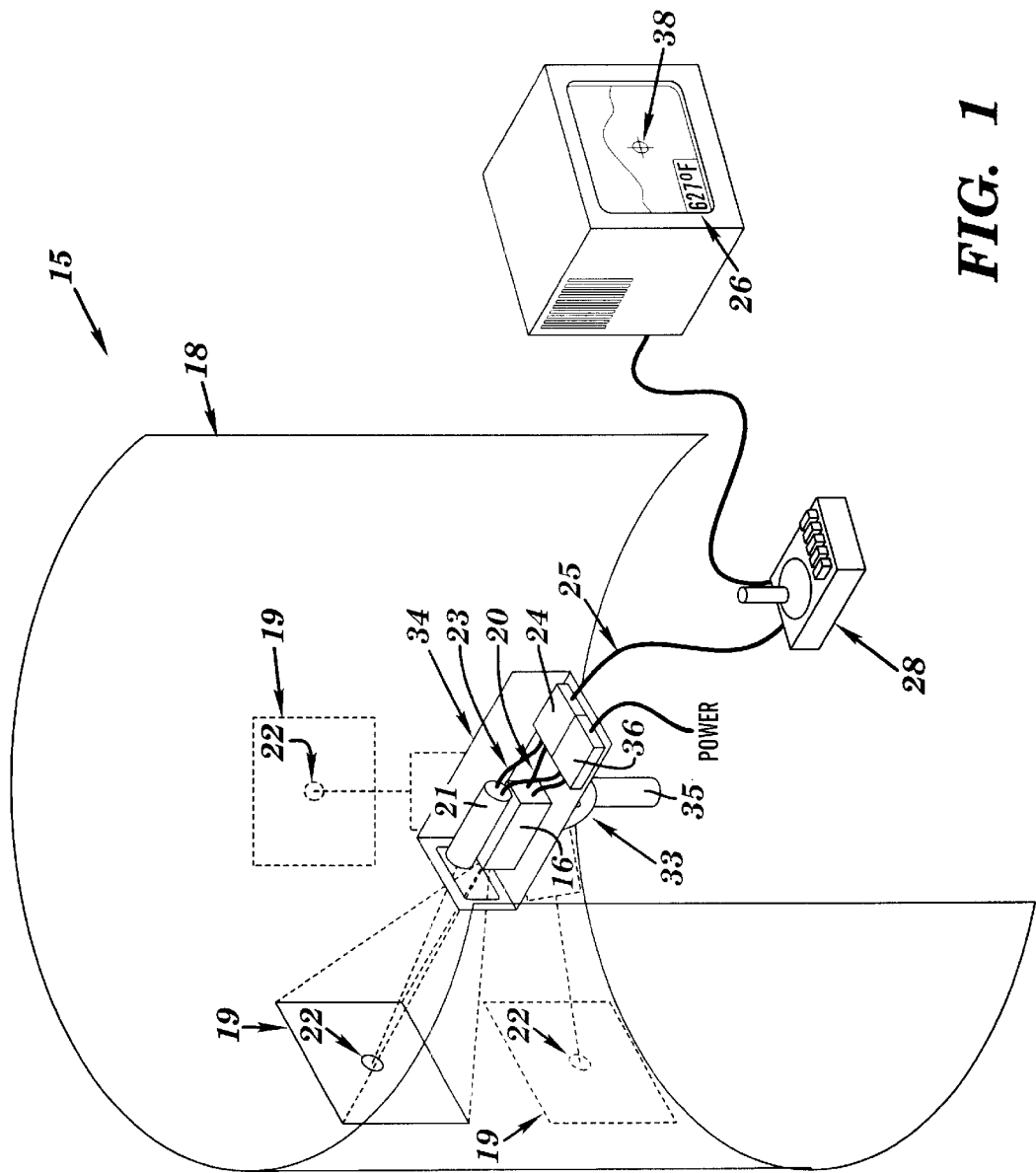
FIG. 1 is a schematic of the improved visualization system.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or access of rotation, as appropriate.

Referring now to the drawings and, more particularly, to FIG. 1 thereof, this invention provides an improved visualization and measuring system, of which the presently preferred embodiment is generally indicated at 15. The system is shown as broadly including a pan/tilt mechanism 33, a pan/tilt head 34, a pan/tilt control device 28 and a visual display device 26.

As shown in FIGS. 1, 2A, and 2B, pan/tilt head 34 is adjustably mounted to pan/tilt mount 35 by pan/tilt mechanism 33 such that pan/tilt head 34 may be moved relative to mount 35. Pan/tilt mechanism 33 and pan/tilt head 34 are standard commercially available pan/tilt systems which allow an operator to move head 34 both horizontally and vertically with respect to mount 35. One example of a suitable pan/tilt system is Pelco's Model PT550P, available from Pelco, Inc. of Clovis, Calif.

Pan/tilt head 34 houses pyrometer 21, camera 16, processor 24, and power module 36. In the preferred embodiment, camera 16 is a standard industrial video camera with a zoom lens. One example of a suitable camera 16 is Sony's Model No. SSC-CX-34, available from Sony Corp. of America, New York, N.Y. However, it is contemplated that camera 16 may be any type of commercially available video sensor, such as a color CCD image sensor, a CMOS image sensor, a focal plane array image sensor or an infrared vidicon tube image sensor. Camera 16 provides a video output signal to processor 24 which, in turn, causes a visual image of field of view 19 of camera 16 to be displayed on display device 26. Camera 16 is mounted such that it receives light through view window 39. In this way, the operator is provided with a visual image of the area in front of panel 55 of pan/tilt head 34.

Pyrometer 21 is a radiation pyrometer which is capable of measuring the temperature of a heated object in its measurement zone 22 by focusing the thermal radiation omitted by the object. Pyrometer 21 provides a measurement signal which is proportional to the intensity of the radiation of a subject object and which is used by the pyrometer's built-in processor to determine the temperature of the object. Measurement zone 22 is the area in which pyrometer 21 is able to sense infrared radiation, and is dependent on the sensitivity of pyrometer 21 and the distance of the subject object from pyrometer 21. Pyrometer 21 can be either a single or a two color ratio pyrometer. One example of a suitable pyrometer 21 is Raytek's Model No. MR1SASF, available from Raytek Corp. of Santa Cruz, Calif. Pyrometer 21 provides a digital signal 23 of the temperature of the subject object to processor 24.

While in the preferred embodiment a pyrometer is used, the invention contemplates that other commercially available noncontact instruments may be employed, such as a gamma radiation sensor, a spectrometer or a directional sound detector.

Both pyrometer 21 and camera 16 are powered by power supply 36. Power supply 36 is shown as being an external supply source, but it is contemplated that a local power source such as a battery may be used.

As shown in FIG. 1, camera 16 has a field of view 19. Field of view 19 is that area in which camera 16 can receive visible light and in turn provide an optical image without adjustment of pan/tilt head 34 in either the vertical or horizontal direction. Similarly, pyrometer 21 has a measurement zone 22 in which it can accurately receive radiation omitted by an object. Pan/tilt head 34 and pan/tilt mount 35 are orientated such that pan/tilt head 34 can rotate through at least ten degrees of horizontal rotation and five degrees of vertical rotation. Camera 16 is housed in pan/tilt head 34 and is orientated parallel to axis x-x of housing 34 such that its field of view changes relative to the rotation of pan/tilt head 34. Pan/tilt head 34 is controlled by a standard pan/tilt controller 28, which may be operated by a system user from a remote control room. Controller 28 is of the type sold by Pelco, Inc. under Model CM7500. Controller 28 also includes a zoom control for camera 16 by which an operator can zoom in or away from objects in camera 16's field of view.

Video output signal 20 and pyrometer 21's radiation measurement output signal 23 are sent to system processor 24. System processor 24 is programmed to receive pyrometer temperature measurement output signal 23 and to format the calculated temperature value such that it is displayed on the display device 26 in real time with the visual image from camera 16. In addition, system processor 24 is programmed to display a graphic indication 38 of the center of measurement zone 22 as well as the appropriate units of the temperature measurement of pyrometer 21. Indication 38 is a graphical depiction of the central measurement point from which pyrometer 21 is receiving radiation.

As shown in FIGS. 2A and 2B, camera 16 is fixed to pan/tilt head 34 and is positioned such that it receives an optical image through view window 39. Camera 16 is housed within a pan/tilt enclosure 34, which protects and stabilizes camera 16.

As shown in FIGS. 2A and 2B, pyrometer 21 is adjustably mounted to the base 41 of pan/tilt head 34 by alignment mechanism 42. Alignment mechanism 42 holds pyrometer 21 over camera 16 and may be manually adjusted to align pyrometer 21 with the central axis of field of view 19 of camera 16. Alignment mechanism 42 comprises a vertical plate 43 with lower rightwardly-extending horizontal mounting flange 44 and upper leftwardly-extending horizontal base flange 45. Mounting flange 44 is fixably connected to pan/tilt head base 41.

Pyrometer 21 is attached to pyrometer mounting plate 46. Mounting plate 46 is, in turn, pivotally mounted to base flange 45 at a pivot connection 55 (not shown), which allows the sensing end 56 of pyrometer 21 to pivot left, right, up and down.

Thus, the front of pyrometer mounting plate 46 may be moved in both the horizontal and vertical direction relative to base flange 45. Pyrometer mounting plate 46 is a generally flat planar member orientated on the same plane as base flange 45. Vertical and horizontal adjustment of pyrometer 21 is effectuated by manual adjustment of pyrometer vertical adjustment 48 and horizontal adjustment 49.

As shown in FIG. 2B, vertical adjustment 48 includes vertical adjustment block 50 and vertical adjustment screw 51. Vertical adjustment block 50 is a solid rectangular member fixably mounted to the rear of pyrometer mounting plate 46. A threaded throughbore extends down through vertical adjustment block 50 and, in turn, through pyrometer mounting plate 46. This threaded throughbore is orientated in the vertical direction. Vertical adjustment screw 51 is threaded for movement through said vertical throughbore such that rotation of vertical adjustment screw 51 in the clockwise direction will move vertical adjustment screw 51 down through vertical adjustment block 51 and out the bottom of pyrometer mounting plate 46. As the bottom of vertical adjustment screw 51 protrudes from the bottom of the vertical throughbore in pyrometer mounting plate 46, it contacts the top of fixed base flange 45. Thus, if adjustment screw 51 is adjusted further in the downward direction, the contact and pressure between the bottom of vertical adjustment screw 51 and the top of base flange 45 will cause the non-sensing end 58 of pyrometer mounting plate 46 to rise and the sensing end of pyrometer 21 to fall relative to pivot connection 55. Alternatively, the rotation of vertical adjustment screw 51 such that it moves in the upward direction will cause lower sensing end 56 of pyrometer mounting plate 46 and pyrometer 21 to rise relative to pivot connection 55.

As shown in FIG. 2B, horizontal adjustment 49 operates in much the same way but in the horizontal direction. Horizontal adjustment block 52 is attached to base flange 45 and is provided with a rectangular slip passage 53 through which the head of horizontal adjustment screw 54 extends. Slip passage 53 is enlarged such that the end of horizontal adjustment screw 54 is free to move vertically. Vertical adjustment block 54 includes a threaded horizontal throughbore orientated in the horizontal direction. Horizontal adjustment screw 54 is then threaded for movement through the horizontal throughbore such that rotation of horizontal adjustment screw 54 causes corresponding movement of pyrometer 21.

In particular, horizontal adjustment screw 54, slip passage 53 and the horizontal throughbore in vertical adjustment block 50 are orientated such that the rotation of horizontal adjustment screw 54 in the clockwise direction will cause vertical adjustment block 50 and, in turn, the non-sensing end 58 of pyrometer mounting plate 46 to pivot to the left and towards horizontal adjustment block 52. Alternatively, rotating horizontal adjustment screw 54 in the counterclockwise direction will push non-sensing end 58 of pyrometer mounting plate 46 away from horizontal adjustment block 52 and cause sensing end 56 of pyrometer 21 to rotate to the left about pivot connection 55. In this way, the alignment of pyrometer 21 relative to camera 16 may be adjusted.

Pyrometer 21 and camera 16 are aligned in the following manner with appropriate adjustment of horizontal and vertical adjustment screws 51 and 54. The center of the field of view of camera 16 and the center of measurement zone 22 of pyrometer 21 must be minimally offset and almost perfectly parallel. As mentioned above, processor 24 is programmed to display a targeting artifact 38 ("cross hairs") in the exact center of the image signal from camera 16. Targeting artifact 38 is displayed on display device 26. Artifact 38 provides the operator with aiming feedback for alignment of the pyrometer and for aiming the pyrometer from a remote location.

Generally, the alignment process uses the video sensor to establish the basic data plane of the system and sets up the video image of field of view 19 as the frame of reference from which camera 16 is initially aligned. Pyrometer 21 is then positioned in rough alignment with camera 16. As mentioned above, pyrometer 21 is mounted on two axis adjustable mounting plate 42, which includes precision adjustment screws 51 and 54, as closely as possible to camera 16. After this initial assembly, pan/tilt head 34 is placed on an adjustable calibration stand and pointed in the general direction of a bare ambient temperature wall distanced one hundred feet away from camera 16 and pyrometer 21. A small, six inch diameter, high output, known variable radiation source is centered on the wall. With the video camera mounted on the alignment stand and energized, the output signal cable 20 is connected to a standard video monitor 26. The image on the monitor includes targeting artifact 38. The calibration stand is then adjusted to move the entire camera head assembly until the technician can see that the six inch diameter, high output, known variable source mounted on the wall is centered in the "cross hairs" of targeting artifact 38 shown on the video monitor screen. Vertical adjustment screw 51 and horizontal adjustment screw 54 are then adjusted until measurement zone 22 of pyrometer 21 has been positioned such that the measuring signal 23 of pyrometer 21 is at its highest output and most exact reading with respect to the known radiation variable source. When this optimal point is found, horizontal adjustment screws 54 and 51 are permanently affixed and the pyrometer and camera are considered aligned.

Figure 3:
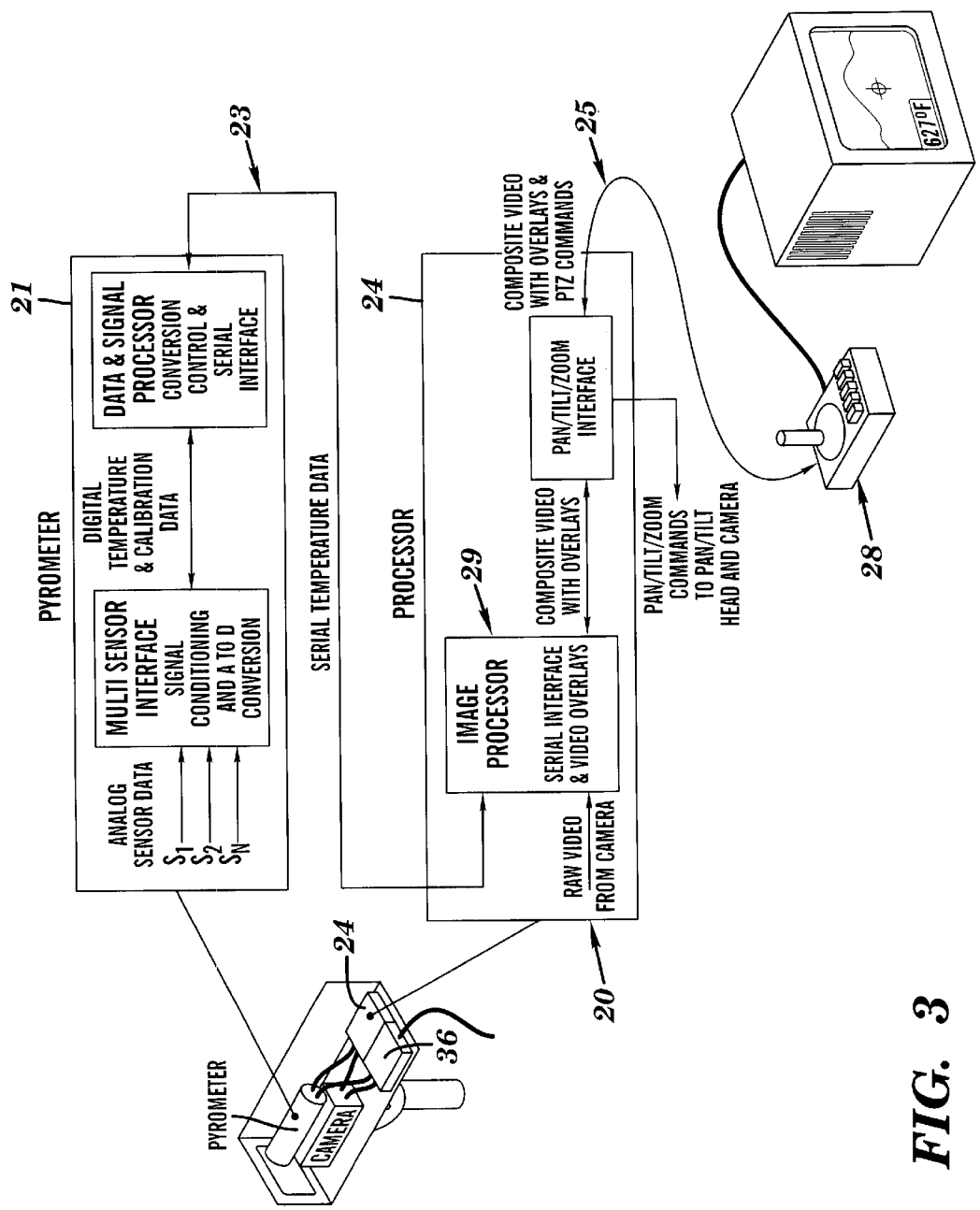
FIG. 3 is a block diagram of the processing for the visualization system.

FIG. 3 is a block diagram of the data processing and control system. As shown, pyrometer 21 includes a multi-sensor interface and a data and signal processor. For a two color or ratio pyrometer, radiation is received in two wavelengths, S1 and S2, and produces an output that is based upon the ratio of the intensity of radiation received in the two wavelengths. An analog-to-digital (AID) convertor converts the analog input to pyrometer 21 into digital form and the pyrometer's processor determines the temperature of the viewed object. The temperature reading in digital form 23 is then transmitted to system processor 24. At the same time, an analog video signal 20 is received by system processor 24 from camera 16 and is digitized for further processing. The resultant digital video image corresponds to a two-dimensional array of pixels.

Thus, system processor 24 includes a processor board which handles five signals other than the typical electronic component power supply connections. These signals include camera 16's composite video image signal 20, pyrometer sensor temperature data signal 23, the digital data signal to pan/tilt mechanism 33, the zoom signal to camera 16, and the connection to control device 28.

System processor 24 produces digital outputs which are representative of the nonvariable graphic elements of artifact 38 and the temperature units of measurement. The constantly updated variable temperature digital signal 23 from pyrometer 21 is received by processor 24 and converted to an output representative of the value of the measured temperature of the subject object.

System processor 24 includes an image processor 29, which receives the digitized video image, along with the variable and nonvariable digital outputs mentioned in the preceding paragraph. Image processor 29 responds by producing a combined digital signal which represents the video image generated by camera 16, overlayed with the graphics representing artifact 38 and the temperature reading from pyrometer 21 with appropriate units.

Artifact 38, temperature units, and the temperature data from pyrometer 21 are inserted in each frame of video signal from camera 16. Within the image processor circuitry 29 of processor 24, each frame of the video signal 20 from camera 16 is modified. In a preferred embodiment, processor 24 is able to modify at least 30 frames per second. The temperature data and units of measurement for the temperature data, either degree symbol C. or degree symbol F., are placed in an appropriate location, typically the bottom left corner of the image which is displayed on display 26. Processor 24 is programmed to insert artifact 38 at the center of field of view 19 of camera 16. This combined signal is then converted into an analog output signal 25 for display on monitor 26. Monitor 26 may be at a remote location, such as in a control room.

Signal 25 also carries pan/tilt and zoom digital control signals from control device 28 to processor 24. The pan/tilt and zoom signals are industry standard signals. Processor 24 receives information from control device 28 and transmits this information to camera 16 and pan/tilt mechanism 33. In particular, the pan/tilt zoom interface digitizes and further processes the pan/tilt and zoom commands received from control 28 and relays such commands to pan/tilt mechanism 33 and camera 16. As a result, pan/tilt head 34 can be moved in a horizontal or vertical direction and camera 16 may be zoomed in or away from objects in field of view 19.

Modifications

The present invention contemplates that many changes and modifications may be made. The particular materials of which the various body parts and component parts are formed are not deemed critical and may be readily varied.

Therefore, while the presently-preferred form of the visualization system has been shown and described, and several modifications discussed, persons skilled in this art will readily appreciate that various additional changes and modifications may be made without departing from the spirit of the invention, as defined and differentiated by the following claims.

What is claimed is:

1. An instrument visualization system, comprising:
   a video sensor having a range of view, a field of view, and a video output signal;
   a non-contact instrument having a measurement zone and a measurement output signal;
   said instrument and said video sensor being so configured and arranged that said measurement zone is aligned in said field of view;
   a processor for processing said video output signal and said measurement output signal and for providing a processor output signal;
   a display device for displaying said processor output signal; and
   a control device for moving said field of view and said measurement zone in said range of view.

2. The visualization system set forth in claim 1, wherein said processor includes an image processor for combining said video output signal and said measurement output signal into a combined output signal.

3. The visualization system set forth in claim 1, wherein an indication of said measurement zone is shown on said display device.

4. The visualization system set forth in claim 1, wherein said video sensor is a color CCD image sensor.

5. The visualization system set forth in claim 1, wherein said video sensor is a CMOS image sensor.

6. The visualization system set forth in claim 1, wherein said video sensor is a Focal Plane Array image sensor.

7. The visualization system set forth in claim 1, wherein said video sensor is an infrared Vidicon Tube image sensor.

8. The visualization system set forth in claim 1, wherein said non-contact instrument is a pyrometer.

9. The visualization system set forth in claim 1, wherein said non-contact instrument is a gamma radiation sensor.

10. The visualization system set forth in claim 1, wherein said non-contact instrument is a spectrometer.

11. The visualization system set forth in claim 1, wherein said non-contact instrument is a directional sound detector.

12. The visualization system set forth in claim 1, wherein said control device may be manually operated from a position remote to said video sensor so as to move said field of view in said range of view.

13. The visualization system set forth in claim 1, wherein said control device may be programmed to move said field of view along a preselected path within said range of view.

14. The visualization system set forth in claim 1 further comprising an alignment system that aligns the non-contact instrument with respect to the video sensor so that the measurement zone is aligned in the field of view.

15. The visualization system as set forth in claim 1 wherein the video output signal is a non-thermal, video output signal.

16. An instrument visualization system comprising:
   an imager having a range of view, a field of view, and a non-thermal, image output signal;
   a non-contact instrument having a measurement zone and a measurement output signal;
   an alignment system that aligns the non-contact instrument with respect to the imager so that the measurement zone is aligned in the field of view;
   a processor system that processes the non-thermal, image output signal and the measurement output signal and provides a processor output signal;
   a display device for displaying the processor output signal; and
   a control device for moving the field of view and the measurement zone in the range of view.

17. The visualization system set forth in claim 16 wherein the imager is one of a color CCD image sensor, a CMOS image sensor, a Focal Plane Array image sensor, and a Vidicon Tube image sensor.

18. The visualization system set forth in claim 16 wherein the non-contact instrument is one of a pyrometer, a gamma radiation sensor, a spectrometer, and a directional sound detector.

19. An instrument visualization system, comprising:
   an imager that receives first image data in a field of view and provides a non-thermal, image output signal;
   a non-contact instrument that receives second image data in a measurement zone within the field of view and provides a measurement output signal;
   a processing system that processes the non-thermal, image output signal and the measurement output signal to provide a combined output signal and causes the combined output signal to be displayed by a display system; and a control device that moves the imager and non-contact instrument to obtain the first and second image data from any location within a range of view of the imager and the non-contact instrument.

20. The instrument visualization system as set forth in claim 19 further comprising an alignment system that aligns the non-contact instrument with respect to the imager.

21. The visualization system set forth in claim 19 wherein the imager is one of a color CCD image sensor, a CMOS image sensor, a Focal Plane Array image sensor, and a Vidicon Tube image sensor.

22. The visualization system set forth in claim 19 wherein the non-contact instrument is one of a pyrometer, a gamma radiation sensor, a spectrometer, and a directional sound detector.

\* \* \* \* \*